(12) United States Patent  
Fujita

(10) Patent No.: US 8,295,473 B2  
(45) Date of Patent: Oct. 23, 2012

(54) TELEPHONE NUMBER MANAGEMENT EQUIPMENT AND TELEPHONE NUMBER CONVERSION METHOD

(75) Inventor: Hideki Fujita, Fukushima (JP)

(73) Assignee: Hitachi, Ltd., Tokyo (JP)

( * ) Notice: Subject to any disclaimer, the term of this patent is extended or adjusted under 35 U.S.C. 154(b) by 1285 days.

(21) Appl. No.: 11/514,926

(22) Filed: Sep. 5, 2006

(65) Prior Publication Data

US 2007/0121915 A1 May 31, 2007

(30) Foreign Application Priority Data

Nov. 28, 2005 (JP) ................................. 2005-342217

(51) Int. Cl.
*H04M 1/00* (2006.01)

(52) U.S. Cl. ......... 379/355.08; 379/355.05; 379/207.15; 379/211.01

(58) Field of Classification Search ............. 379/221.14, 379/211.01, 207.15, 355.07, 355.01, 355.05, 379/355.08, 211.02

See application file for complete search history.

(56) References Cited

U.S. PATENT DOCUMENTS

| | | | | |
|---|---|---|---|---|
| 2003/0072431 | A1* | 4/2003 | Lamy et al. | 379/211.01 |
| 2003/0174825 | A1* | 9/2003 | Aldridge et al. | 379/207.15 |
| 2005/0129206 | A1* | 6/2005 | Martin | 379/211.01 |
| 2006/0140200 | A1* | 6/2006 | Black et al. | 370/401 |

FOREIGN PATENT DOCUMENTS

| | | |
|---|---|---|
| JP | 11-331346 | 11/1999 |
| JP | 2000-270104 | 9/2000 |
| JP | 2003-219445 | 7/2003 |
| JP | 2004-193802 | 7/2004 |
| JP | 2005-094646 | 4/2005 |

* cited by examiner

*Primary Examiner* — Antim Shah

(74) *Attorney, Agent, or Firm* — Antonelli, Terry, Stout & Kraus, LLP.

(57) ABSTRACT

A technology for converting a source or destination telephone number according to usage purposes of a telephone apparatus user. A number converter (115) is provided to convert the source telephone number based on the destination telephone number to which a call is made from an IP voice terminal (130) or a voice terminal (140), using information stored in a called number conversion database (112). The number converter (115) also converts the destination telephone number based on the source telephone number from which a call is made from the IP voice terminal (130) or the voice terminal (140), using information stored in a calling number conversion database (113).

10 Claims, 8 Drawing Sheets

| INDEX | CALLED NUMBER | CALLING NUMBER DELETION DIGIT NUMBER | ADDITIONAL NUMBER TO CALLING-NUMBER | CALLED NUMBER DELETION DIGIT NUMBER | ADDITIONAL NUMBER TO CALLED-NUMBER |
|---|---|---|---|---|---|
| 1 | 0355559999 | 32 | 0355556666 | 0 | |
| 2 | 03 | 32 | 0355551111 | 0 | |
| ⋮ | ⋮ | ⋮ | ⋮ | ⋮ | ⋮ |
| n | | 0 | | 0 | |

| INDEX | CALLING NUMBER | CALLING NUMBER DELETION DIGIT NUMBER | ADDITIONAL NUMBER TO CALLING-NUMBER | CALLED NUMBER DELETION DIGIT NUMBER | ADDITIONAL NUMBER TO CALLED-NUMBER |
|---|---|---|---|---|---|
| 1 | 0355559999 | 0 | | 32 | 300 |
| 2 | | 0 | | 0 | |
| ⋮ | ⋮ | ⋮ | ⋮ | ⋮ | ⋮ |
| n | | 0 | | 0 | |

113a 113b 113c 113d 113e 113f

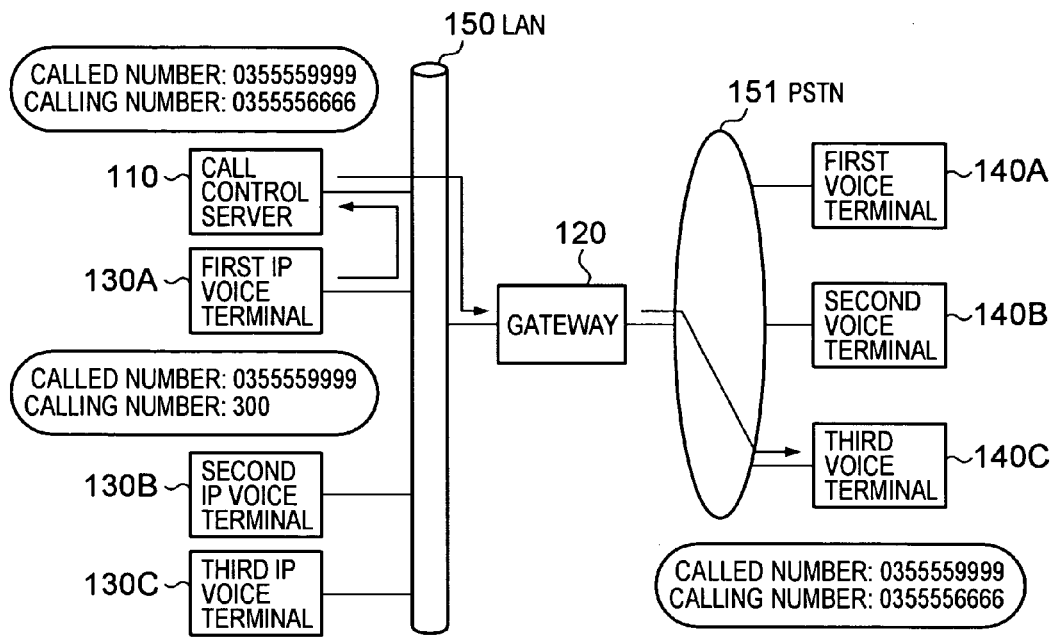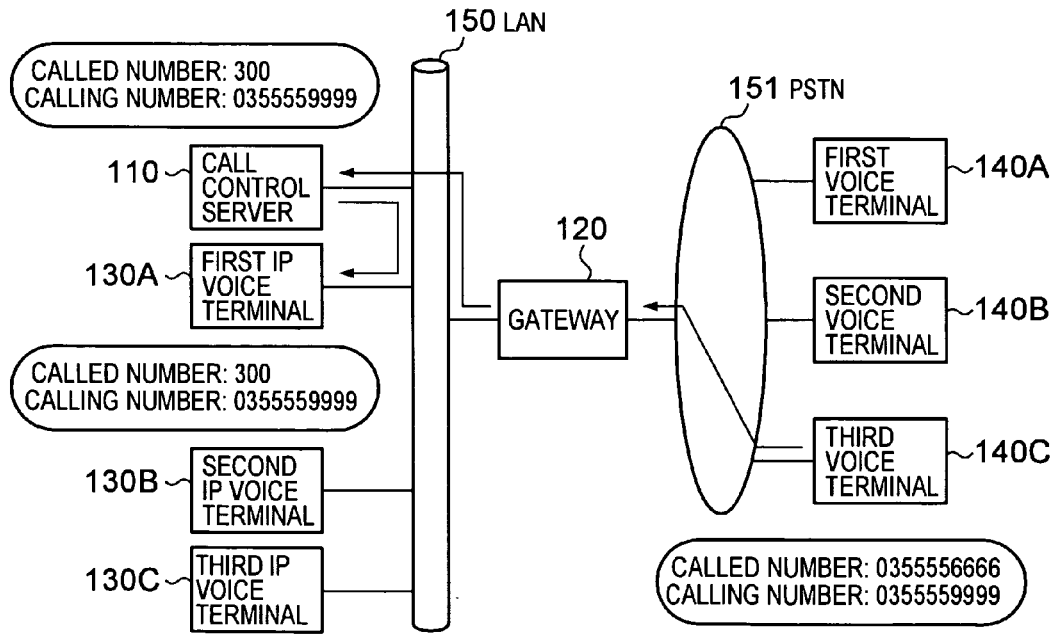

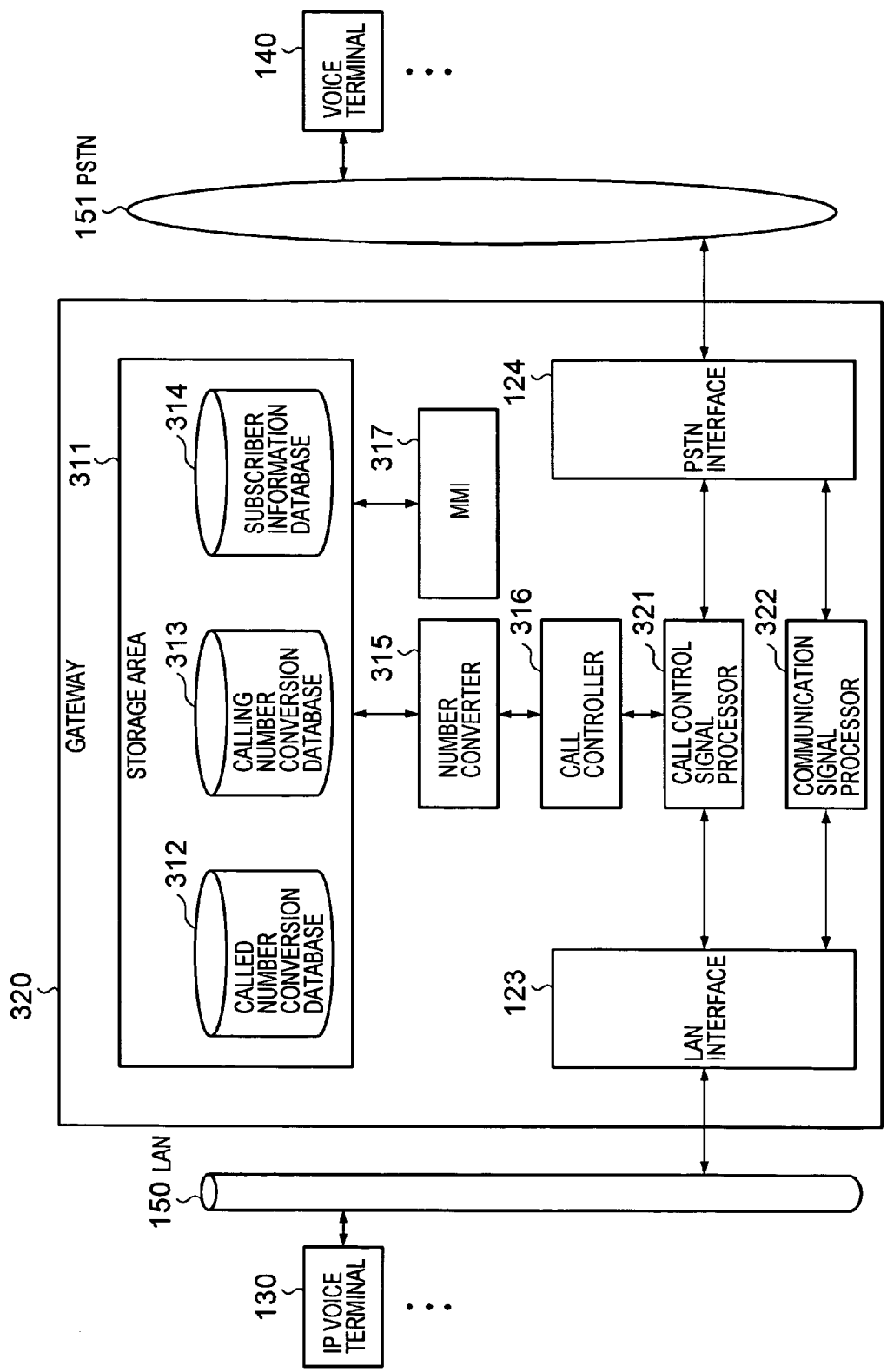

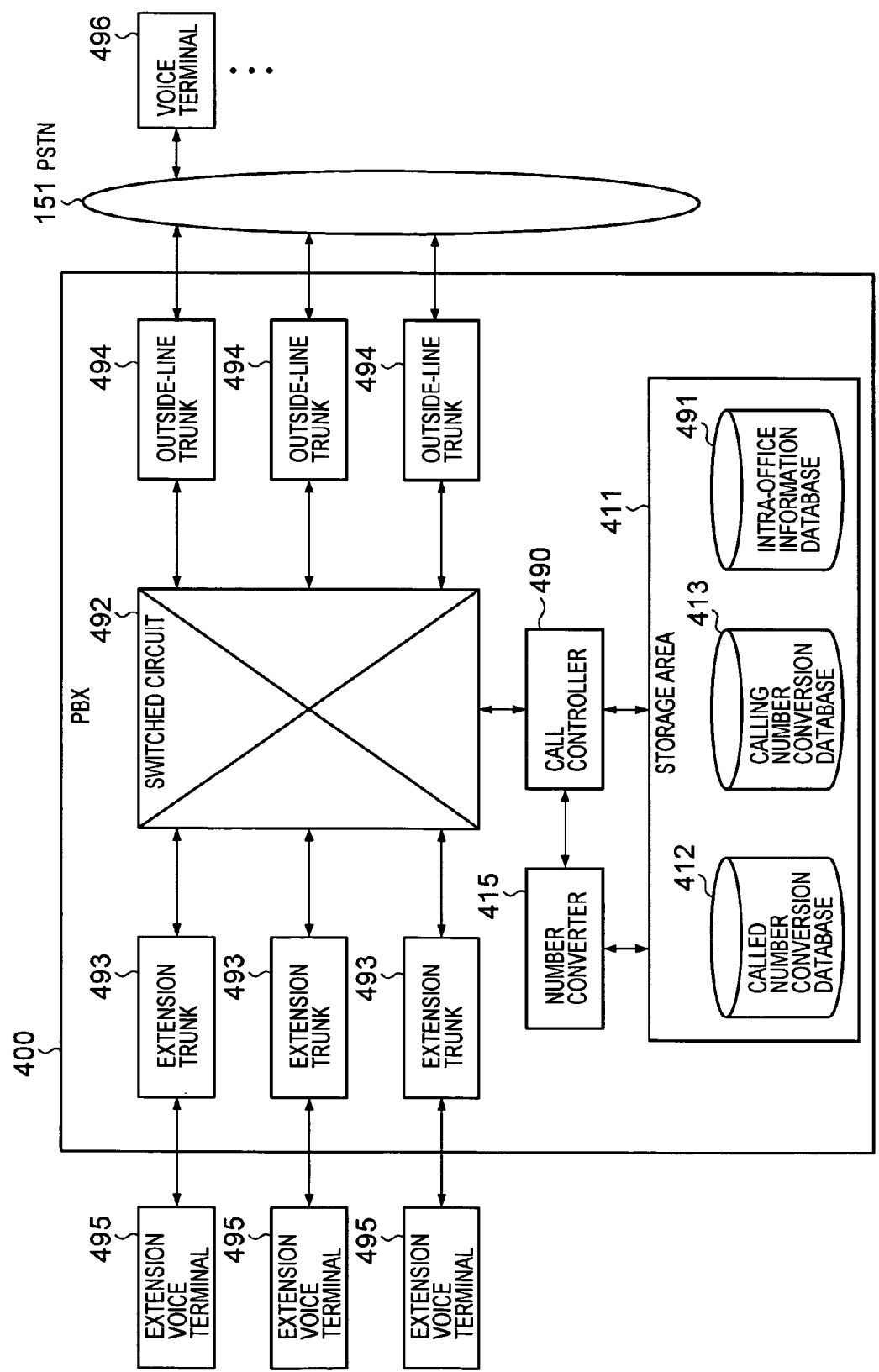

TELEPHONE NUMBER MANAGEMENT EQUIPMENT AND TELEPHONE NUMBER CONVERSION METHOD

BACKGROUND OF THE INVENTION

The present invention relates to technology for converting a telephone number when a call is originated or received.

Japanese Patent Laid-Open Publication No. 2005-94646 (hereinafter, referred to as Patent Document 1) discloses a technology which converts a telephone number when a call is originated or received.

According to the technology disclosed in Patent Document 1, an IP (Internet Protocol) telephone number is stored by associating the IP telephone number with a PSTN (Public Switched Telephone Network) telephone number, whereby the PSTN telephone number is converted into the IP telephone number when a call is originated.

SUMMARY OF THE INVENTION

The technology disclosed in Patent Document 1 merely converts a destination telephone number; it is impossible to convert a source telephone number based on a destination telephone number, nor to convert a destination telephone number based on a source telephone number, according to purposes of a telephone apparatus user.

Accordingly, an object of the present invention is to provide a technology for allowing a source or destination telephone number to be converted according to purposes of a telephone apparatus user.

In order to solve the above problems, one aspect of the present invention is to provide a technology for associating a source telephone number with a destination telephone number to convert the source telephone number, and for associating a destination telephone number with a source telephone number to convert the destination telephone number.

Specifically, according to this aspect of the present invention, equipment is provided for managing a telephone number of a voice terminal by converting either a destination or source telephone number based on the other party's telephone number.

The present invention thus allows a source telephone number to be associated with a destination telephone number to convert the source telephone number, or a destination telephone number to be associated with a source telephone number to convert the destination telephone number. As a result, it becomes possible to convert source and destination telephone numbers depending on purposes of a telephone apparatus user.

BRIEF DESCRIPTION OF THE DRAWINGS

FIG. 2 is a schematic view of a called number conversion database;

FIG. 3 is a schematic view of a calling number conversion database;

FIG. 6 is a schematic view showing an application of the telephony system in which a call is made from a first IP voice terminal to a third voice terminal;

FIG. 7 is a schematic view showing an application of the telephony system in which a call is made from the third voice terminal to the first IP voice terminal;

FIG. 9 is a schematic view of a gateway; and

FIG. 10 is a schematic view of a PBX.

DESCRIPTION OF THE PREFERRED EMBODIMENTS

Figure 1:
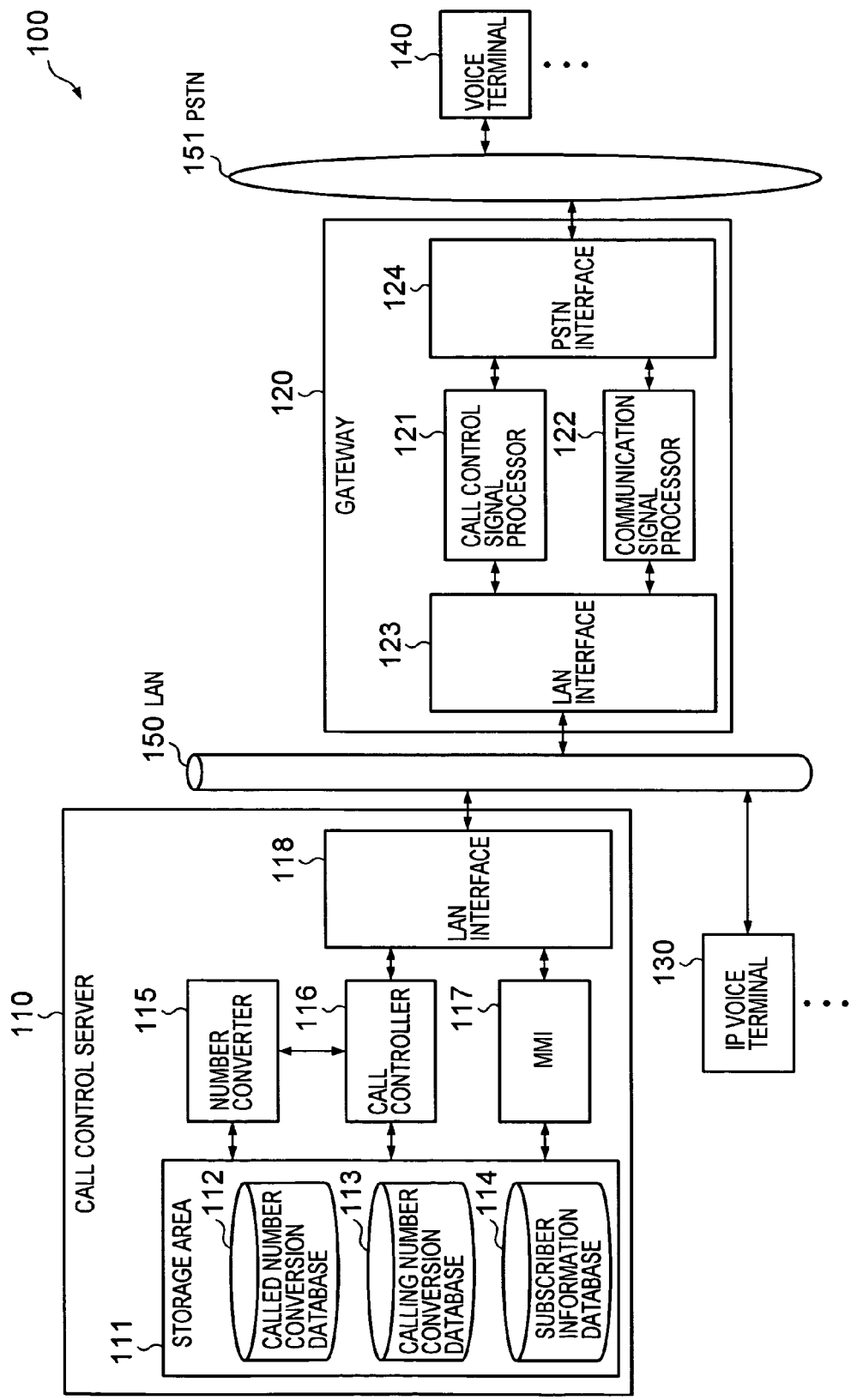
FIG. 1 is a schematic view showing a telephony system.

FIG. 1 is a schematic view showing a telephony system 100 as one embodiment of the present invention.

As shown in FIG. 1, the telephony system 100 includes a call control server 110 and a gateway 120.

The call control server 110 and the gateway 120 are connected in a LAN (Local Area Network) 150.

To the LAN 150, an IP voice terminal 130 is also connected.

A voice terminal 140 is connected to the gateway 120 through a PSTN 151.

The call control server 110 includes a storage area 111, a number converter 115, a call controller 116, an MMI (Man-Machine Interface) 117 and a LAN interface 118.

The storage area 111 stores a called number conversion database 112; a calling number conversion database 113 which has originator discernment information for discerning an source telephone number and destination telephone number conversion information for converting a destination telephone number; and a subscriber information database 114.

Referring to FIG. 2, the called number conversion database 112 includes an index field 112a, a called number field 112b, a calling number deletion digit number field 112c, an additional number to calling number field 112d, a called number deletion digit number field 112e, and an additional number to called number field 112f.

In the called number field 112b, destination telephone number discernment information for discerning a destination telephone number is contained. In the calling number deletion digit number field 112c, deletion information for specifying a number of digits to be deleted from the source telephone number is contained. In the additional number to calling number field 112d, additional number information for specifying a number to be added to a source telephone number is contained.

In the index field 112a, a discernment number that is an index for each piece of information to be entered into the called number conversion database 112 is contained.

In the called number field 112b, a destination telephone number to be converted from a source telephone number is contained. Specifically, when a call is made from the IP voice terminal 130 connected to the LAN 150, if the destination telephone number matches the number input to the field 112b, the source telephone number is converted as will be described later. When a call is made from the voice terminal 140 connected to the PSTN 151, to the IP voice terminal 130 connected to the LAN 150, if the destination telephone number matches the number input to the field 112b, the source telephone number is converted as will be described later.

In this case, the destination telephone number input to the called number field 112b may include the entire telephone number uniquely assigned to the destination, or may include only part of a destination telephone number.

In order to determine whether or not a destination telephone number matches the number input to the called number field 112b, matching is performed from the leading digit of each destination telephone number. If the number input to the called number field 112b is included in the destination telephone number, the number converter 115 (to be described later) determines that a match is obtained (the so-called, prefix search). Furthermore, if a plurality of matches is obtained for the destination telephone number in the numbers input to the called number field 112b, the longest number is selected among the matching numbers (the so-called, longest match system).

A number of digits that are to be deleted from a source telephone number (a telephone number of a terminal which has requested a connection to the destination telephone number matching the number input to the called number field 112b) are input to the calling number deletion digit number field 112c.

In this embodiment, the number of digits input to the calling number deletion digit number field 112c is the number of digits counted from the start of a source telephone number.

For example, inputting the largest number of digits in a telephone number system used, to the calling number deletion digit number field 112c, completely deletes the entire source telephone number to be converted.

For the number of digits, "0" is input to the calling number deletion digit number field 112c, to avoid deleting the source telephone number to be converted.

In the additional number to calling number field 112d, a number to be added to a source telephone number to be converted is contained.

In this embodiment, the number of digits input to the calling number deletion digit number field 112c is deleted from the start of the source telephone number to be converted, and the number contained in the additional number to calling number field 112d is then added to the start of the deleted original number.

In the case where the entire source telephone number to be converted has been deleted depending on the number of digits input to the calling number deletion digit number field 112c, the number contained in the additional number to calling number field 112d is notified to the destination.

The calling number deletion digit number field 112c is made empty, thereby avoiding adding any number. Specifically, the number obtained by deleting the number of digits input to the calling number deletion digit number field 112c from the top of the source telephone number to be converted is notified to the destination.

The called number deletion digit number field 112e contains a number of digits to be deleted from the destination telephone number matching the number input to the called number field 112b.

In this embodiment, the number of digits input to the called number deletion digit number field 112e is the number of digits counted from the start of a destination telephone number.

In the additional number to called number field 112f, a number to be added to the destination telephone number matching the number contained in the called number field 112b is input.

In this embodiment, the number of digits input to the called number deletion digit number field 112e is deleted from the start of the destination telephone number to be converted, and the number contained in the additional number to called number field 112f is then added to the start of the deleted original number.

In this embodiment, the destination telephone number matching the number input to the called number field 112b is also converted. In cases in which the number is not converted, however, the called number deletion digit number field 112e and the additional number to called number field 112f do not have to be provided.

Referring to FIG. 3, the calling number conversion database 113 includes an index field 113a, a calling number field 113b, a calling number deletion digit number field 113c, an additional number to calling number field 113d, a called number deletion digit number field 113e and an additional number to called number field 113f.

In the calling number field 113b, source telephone number discernment information for discerning a source telephone number is contained. In the called number deletion digit number field 113e, deletion information for specifying a number of digits to be deleted from the destination telephone number is contained. In the additional number to called number field 113f, additional number information for specifying a number to be added to a destination telephone number is contained.

In the index field 113a, a discernment number to be an index for each piece of information to be entered into the calling number conversion database 113 is contained.

In the calling number field 113b, a source telephone number to be converted from destination telephone numbers is contained. Specifically, when a call is made from the voice terminal 140 connected to the PSTN 151, to the IP voice terminal 130 connected to the LAN 150, if the source telephone number matches the number input to the field 113b, the destination telephone number is converted as will be described later. When a call is made from the IP voice terminal 130 connected to the LAN 150, having a telephone number matching the number input to the field 113b, the destination telephone number is converted as will be described later.

In this case, the source telephone number input to the calling number field 113b, similarly to the above-mentioned called number field 112b of the called number conversion database 112, may include the entire telephone number uniquely assigned to a destination, or may include only part of a destination telephone number.

In order to determine whether or not a source telephone number matches the number input to the field 113b in the number converter 115 (to be described later), similarly to the called number field 112b described above, the so-called prefix search is performed. If a plurality of matches is obtained for the source telephone number, a single number is specified according to a longest match rule.

In the calling number deletion digit number field 113c, a number of digits to be deleted from a source telephone number are contained.

In this embodiment, the number of digits input to the calling number deletion digit number field 113c is the number of digits counted from the start of a source telephone number.

In the additional number to calling number field 113d, a number to be added to the source telephone number matching the number input to the calling number field 113b is contained.

In this embodiment, the number of digits input to the calling number deletion digit number field 113c is deleted from the start of the source telephone number to be converted, and the number contained in the additional number to calling number field 113d is then added to the start of the deleted original number.

In the called number deletion digit number field 113e, a number of digits for deleting the destination telephone number to be converted (telephone number specified as a number to call by a terminal having a source telephone number matching the number input to the calling number field 113b) is contained.

In this embodiment, the number of digits input to the called number deletion digit number field 113e is the number of digits counted from the start of a destination telephone number.

In the additional number to called number field 113f, a number to be added to a destination telephone number to be converted is contained.

In this embodiment, the number of digits input to the called number deletion digit number field 113e is deleted from the start of the destination telephone number to be converted, and the number contained in the additional number to called number field 113f is then added to the start of the deleted original number.

In this embodiment, the source telephone number matching the number input to the calling number field 113b is also converted. In order not to convert the number, however, the calling number deletion digit number field 113c and the additional number to calling number field 113d do not have to be provided.

The subscriber information database 114 stores information including the IP addresses of the gateway 120 for controlling a call on the call control server 110 and of the IP voice terminal 130. The subscriber information database 114 stores information required for a call control protocol such as H323, SIP (Session Initiation Protocol) or MGCP (Media Gateway Control Protocol).

The number converter 115 converts a telephone number using the called number conversion database 112 and the calling number conversion database 113.

In this embodiment, the number converter 115 extracts the destination and source telephone numbers from a call control signal transmitted from the gateway 120 or the IP voice terminal 130 so as to perform a search through the called number field 112b in the called number conversion database 112 and through the calling number field 113b in the calling number conversion database 113.

If the destination telephone number matches the number input to the called number field 112b, the number converter 115 converts the destination and source telephone numbers based on the information contained in the calling number deletion digit number field 112c, the additional number to calling number field 112d, the called number deletion digit number field 112e, and the additional number to called number field 112f, corresponding to the matching number.

When a destination telephone number is "0355559999", for example, as shown in the called number conversion database 112 of FIG. 2, since "0355559999" is input to the called number field 112b belonging to the row having "1" in its index field 112a, the source telephone number of the terminal from which a call is made to this destination telephone number is deleted from the start by the number of digits input to the calling number deletion digit number field 112c, and the number "0355556666" contained in the additional number to calling number field 112d is then added to the start of the deleted original number.

In this embodiment, "0", indicating that there is no digit to be deleted, is input to the called number deletion digit number field 112e belonging to the row having "1" in its index field 112a. Since the additional number to called number field 112f is made empty so as to indicate that there is no number to be added, the destination telephone number is not converted.

If a source telephone number matches the number input to the calling number field 113b, the number converter 115 converts the destination and source telephone numbers based on the information contained in the calling number deletion digit number field 113c, the additional number to calling number field 113d, the called number deletion digit number field 113e, and the additional number to called number field 113f, corresponding to the matching number.

When a source telephone number is "0355559999", for example, as shown in the calling number conversion database 113 of FIG. 3, since "0355559999" is input to the calling number field 113b belonging to the row having "1" in its index field 113a, the destination telephone number, to which the terminal making a call from this source telephone number has requested a connection, is deleted from the start by the number of digits input to the called number deletion digit number field 113e, and the number "300" contained in the additional number to called number field 113f is then added to the start of the deleted number.

In this embodiment, "0", indicating that there is no digit to be deleted, is input to the calling number deletion digit number field 113c belonging to the row having "1" in its index field 113a. Since the additional number to calling number field 113d is made empty to indicate that there is no number to be added, the source telephone number is not converted.

The controller 116 controls a call according to call control protocols, using the information stored in the subscriber information database 114.

In this case, the call control process performed by the controller 116 is the same as in the process which has been widely used, and its description is omitted here.

If at least one of the destination and source telephone numbers is converted in the number converter 115, the controller 116 performs the conventional call control process for the converted telephone number.

Specifically, if the destination telephone number has been converted, the call is controlled so as to be connected to the converted telephone number. If a source telephone number has been converted, the call is controlled so as to be connected based on an assumption that the call is made from the converted telephone number.

An MMI 117 carries out processing including the registration, update and deletion of each database 112, 113, and 114, as well as the setting of configuration information on the call control server 110.

A LAN interface 118 transmits and receives a frame storing an IP packet through the LAN 150.

The call control server 110 described above is realized by a so-called computer. Specifically, the storage area 111 is realized by an auxiliary storage such as a hard disk; the number converter 115, the controller 116 and the MMI 117 are realized by executing a predetermined program stored in the auxiliary storage in a CPU (Central Processing Unit); and the LAN interface 118 is realized by a NIC (Network Interface Card).

The gateway 120 includes a call control signal processor 121, a communication signal processor 122, a LAN interface 123, and a PSTN interface 124.

The call control signal processor 121 processes a call control signal according to call control protocols. Specifically, a message indicated by the call control signal received through the PSTN interface 124 (to be described later) is IP packetized according to call control protocols. A frame containing the IP packet is then transmitted to the call control server 110 through the LAN interface 123. The IP packet is extracted from the frame received through the LAN interface 123, and the IP-packet call control message is then extracted. Subsequently, following call control protocols, the call control message is analyzed; a call control signal indicating the call control message is generated; and the call control signal is transmitted through the PSTN interface 124 to the voice terminal 140 connected to the PSTN 151.

The communication signal processor 122 makes an IP packet of the communication signal (voice signal, for example) received through the PSTN interface 124 following RTP (Real-time Transfer Protocol). A frame containing the IP packet is then transmitted to the IP voice terminal 130 through the LAN interface 123. The IP packet is extracted from the frame received through the LAN interface 123, and a communication signal is extracted from the extracted IP packet following RTP. Subsequently, the extracted communication signal is transmitted to the voice terminal 140 through the PSTN interface 124.

The LAN interface 123 transmits and receives a frame storing an IP packet through the LAN 150.

The PSTN interface 124 transmits and receives a communication signal or control signal through the PSTN 151.

Figure 4:
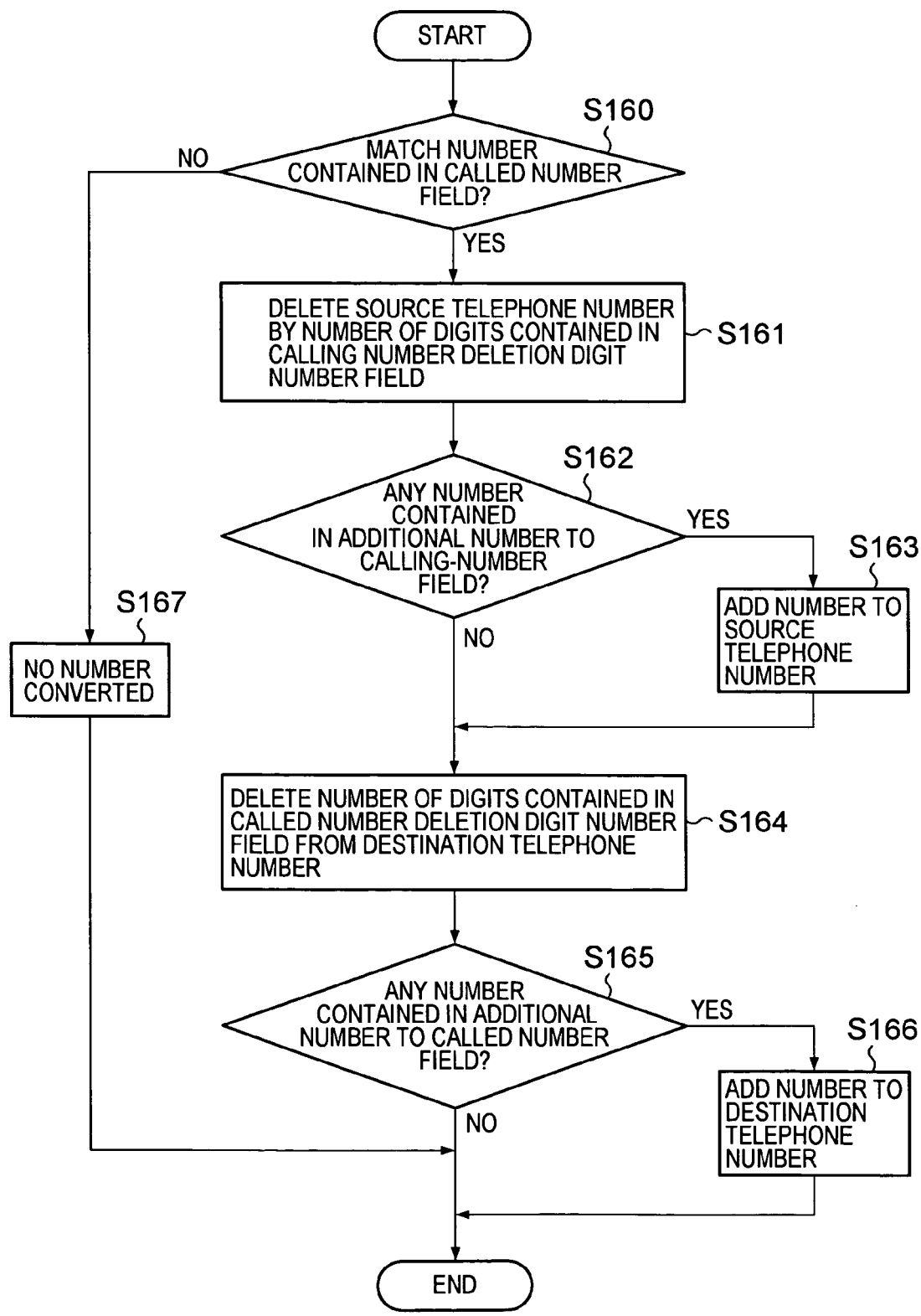
FIG. 4 is a flow chart showing a process of converting a telephone number based on a destination telephone number.

In the telephony system 100 configured as has been described above, a description is given for a process of converting a telephone number based on a destination telephone number, with reference to the flow chart shown in FIG. 4.

First, the number converter 115 of the call control server 110 performs a search to determine whether or not the destination telephone number extracted from the call control signal, transmitted from the IP voice terminal 130 or the gateway 120, matches the number input to the called number fields 112b in the called number conversion database 112 (S160). Prefix search is performed in this case. In the case where a plurality of matches is obtained, a single number is specified according to the longest match rule.

If a match is obtained for the destination telephone number (S160), the number contained in the number of digits input to the calling number deletion digit number fields 112c is deleted from the start of the source telephone number contained in the call control signal from which the destination telephone number has been extracted (S161). In the case where "0" is input to the calling number deletion digit number field 112c as a number of digits, the source telephone number is not deleted.

Next, a determination is made as to whether or not any number is input to the additional number to calling number field 112d (S162).

If any number is contained in the additional number to calling number field 112d (S162), the contained number is added to the start of the source telephone number (S163).

On the other hand, if no number is contained in the additional number to calling number field 112d (S162), or if any number has been added in Step S163, the number contained in the number of digits input to the called number deletion digit number field 112e is deleted from the start of the matching destination telephone number (S164). In cases in which the number of digits input to the called number deletion digit number field 112e is "0", the destination telephone number is not deleted.

Next, a determination is made as to whether or not any number is contained in the additional number to called number field 112f (S165).

If any number is contained in the additional number to called number field 112f (S165), the contained number is added to the start of the destination telephone number (S166).

In cases where no match is obtained for the destination telephone number (S160), the telephone number is not converted (S167), followed by the completion of the process.

Figure 5:
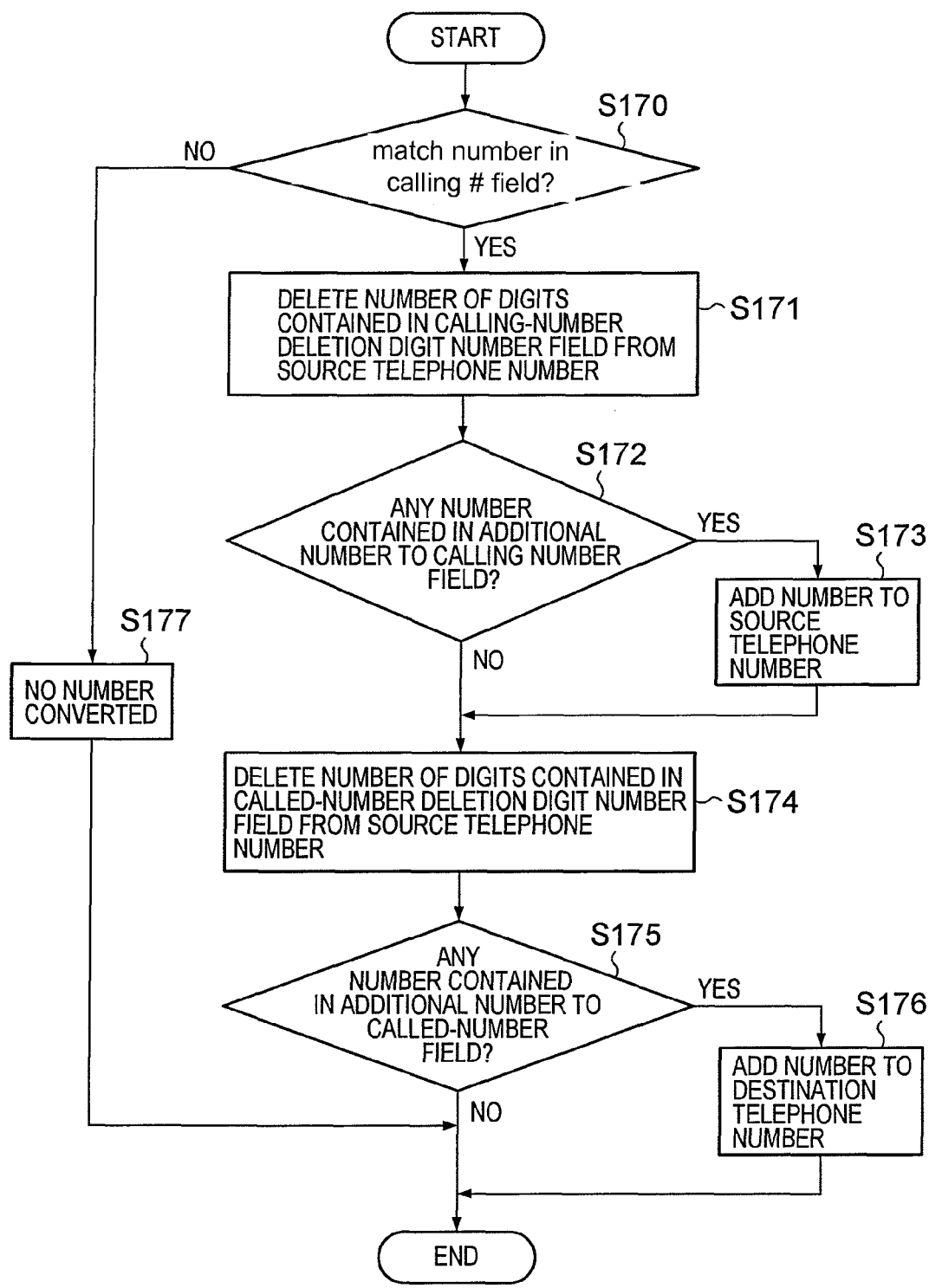
FIG. 5 is a flow chart showing a process of converting a telephone number based on a source telephone number.

FIG. 5 is a flow chart showing a process of converting a telephone number based on a source telephone number in the telephony system 100.

First, the number converter 115 of the call control server 110 performs a search to determine whether or not the source telephone number extracted from the call control signal transmitted from the IP voice terminal 130 or the gateway 120 matches the number input to the calling number field 113b of the calling number conversion database 113 (S170). Prefix search is performed in this case. In the case where a plurality of matches is obtained, a single number is specified according to the longest match rule.

If a match is obtained for the source telephone number (S170), the number contained in the number of digits input to the calling number deletion digit number field 113c is deleted from the start of the source telephone number (S171). In the case where "0" is input to the calling number deletion digit number field 113c as a number of digits, the source telephone number is not deleted.

Next, a determination is made as to whether or not any number is contained in the additional number to calling number field 113d (S172).

If any number is contained in the additional number to calling number field 113d (S172), the contained number is added to the start of the source telephone number (S173).

On the other hand, if no number is contained in the additional number to calling number field 113d (S172), or if any number has been added in Step S173, the number contained in the number of digits input to the called number deletion digit number field 113e is deleted from the start of the destination telephone number contained in the call control signal from which the source telephone number has been extracted (S174). In the case where the number of digits input to the called number deletion digit number field 113e is "0", the destination telephone number is not deleted.

Next, a determination is made as to whether or not any number is contained in the additional number to called number field 113f (S175).

If any number is contained in the additional number to called number field 113f (S175), the contained number is added to the start of the destination telephone number (S176).

In cases where no number matches the source telephone number (S170), the telephone number is not converted (S177), followed by the completion of the process.

FIG. 6 shows an application of the telephony system 100 in which a call is made from a first IP voice terminal 130A to a third voice terminal 140C.

FIG. 6 shows a case where the first IP voice terminal 130A, a second IP voice terminal 130B, and a third IP voice terminal 130C are connected to the LAN 150 in the telephony system 100 shown in FIG. 1, and a first voice terminal 140A, a second voice terminal 140B, and the third voice terminal 140C are connected to the PSTN 151.

When the first IP voice terminal 130A makes a call to the third voice terminal 140C, a call control signal is transmitted to the call control server 110, indicating that the third voice terminal 140C's telephone number "0355559999" is considered as the destination telephone number, and that the first IP voice terminal 130A's own extension number "300" is considered as the source telephone number.

The call control server 110 extracts the destination and source telephone numbers from the received call control signal. A search is then performed to determine as to whether or not the extracted destination telephone number matches the number input to the called number field 112b of the called number conversion database 112. If a match is obtained, the telephone number is converted.

In this case, as shown in FIG. 2, since the number "0355559999", which matches the destination telephone number "0355559999", is input to the called number field 112b specified by the number "1" in the index field 112a of the called number conversion database 112, the telephone number is converted based on the conversion rule specified by the row of Index "1".

Since "32" is input to the calling number deletion digit number field 112c of Index "1", the source telephone number "300" is deleted by "32" digits. In this case, since the source telephone number "300" has only three digits, the entire source telephone number is deleted.

Since "0355556666" is contained in the additional number to calling number field 112d, the number is used instead of the completely deleted source telephone number.

On the other hand, the call control server 110 performs a search to determine whether or not the extracted source telephone number matches the number input to the calling number field 113b of the calling number conversion database 113. If a match is obtained, the telephone number is converted.

In this case, the telephone number is not converted based on the source telephone number on an assumption that no number matching the source telephone number "300" is input to the calling number field 113b.

In the call-control server 110, where a telephone number has been converted as described above, a call control is processed using the converted telephone number following a predetermined call control protocol; a call control signal is transmitted to the gateway 120, indicating that the destination telephone number is to be "0355559999" and that the source telephone number is to be "0355556666"; and a connection is requested to the third voice terminal 140C.

The connection is then established between the first IP voice terminal 130A and the third voice terminal 140C through the gateway 120.

In the call control server 110, since the source telephone number is converted from "300" to "0355556666", the converted source telephone number is notified to the third voice terminal 140C.

Therefore, a configuration may be set up so as to notify a specified telephone number to a destination when a call is made to another specified telephone number.

Examples of applications of the system include a case where a telephone number of a company department to contact (for example, Administration Department) is notified to a destination when an emergency call is made to a police station or fire station even if from another department of the company; and a case in which a telephone number of a company hub in a defined area (for example, local office) is notified to a destination when a call is made to any telephone number within the area.

FIG. 7 shows an application of the telephony system 100 in which a call is made from the third voice terminal 140C to the first IP voice terminal 130A.

Similarly to FIG. 6, FIG. 7 shows a case where the first IP voice terminal 130A, the second IP voice terminal 130B, and the third IP voice terminal 130C are connected to the LAN 150 in the telephony system 100 shown in FIG. 1, and where the first voice terminal 140A, the second voice terminal 140B, and the third voice terminal 140C are connected to the PSTN 151.

When the third voice terminal 140C makes a call to the first IP voice terminal 130A, a call control signal is transmitted to the gateway 120, indicating that "0355556666", the telephone number to the gateway 120 connected to the LAN 150 to which the first IP voice terminal 130A belongs, is considered as the destination telephone number, and that "0355559999", the third voice terminal 140C's own telephone number, is considered as the source telephone number.

The gateway 120 generates a frame storing the received call control signal in an IP packet and transmits the frame to the call control server 110.

The call control server 110 extracts the call control signal from the received frame, and extracts the destination and source telephone numbers from the extracted call control signal.

A search is then performed to determine whether or not the extracted destination telephone number matches the number input to the called number field 112b of the called number conversion database 112. If a match is obtained, the telephone number is converted.

In this case, no number matching the destination telephone number "0355556666" is input to the called number field 112b of the called number conversion database 112, and no conversion is performed based on the destination telephone number.

The call control server 110 also performs a search to determine whether or not the extracted source telephone number matches the number input to the calling number field 113b of the calling number conversion database 113. If a match is obtained, the telephone number is converted.

In this case, as shown in FIG. 3, since a number which matches the source telephone number "0355559999" is input to the calling number field 113b specified by the number "1" in the index field 113a of the calling number conversion database 113, the telephone number is converted based on the conversion rule specified by the row of Index "1".

Since "32" is input to the called number deletion digit number field 113e of Index "1", the destination telephone number "0355556666" is deleted by "32" digits. In this case, since the destination telephone number "0355556666" has only ten digits, the entire destination telephone number is deleted.

Since "300" is contained in the additional number to called number field 113f, the number is used instead of the completely deleted source telephone number.

In the call-control server 110, where a telephone number has been converted as described above, a call control is processed using the converted telephone number following a predetermined call control protocol; a call control signal is transmitted to the first IP voice terminal 130A, indicating that the destination telephone number is to be "300" and that the source telephone number is to be "0355559999"; and a connection is established between the third voice terminal 140C and the first IP voice terminal 130A.

Therefore, a configuration may be set up to forward a call to a specified telephone number when the call is made from another specified telephone number.

For example, applications of the system include a case where a callback from a police station or fire station is connected to a telephone number of a company department to contact (for example, Administration Department), and a case where a call made from anywhere within a defined area is connected to a telephone number of a department in charge of the area.

The above-described embodiment relates to cases where the call control server 110 includes the called number conversion database 112, the calling number conversion database 113 and the number converter 115, but is not limited to such cases.

Figure 8:
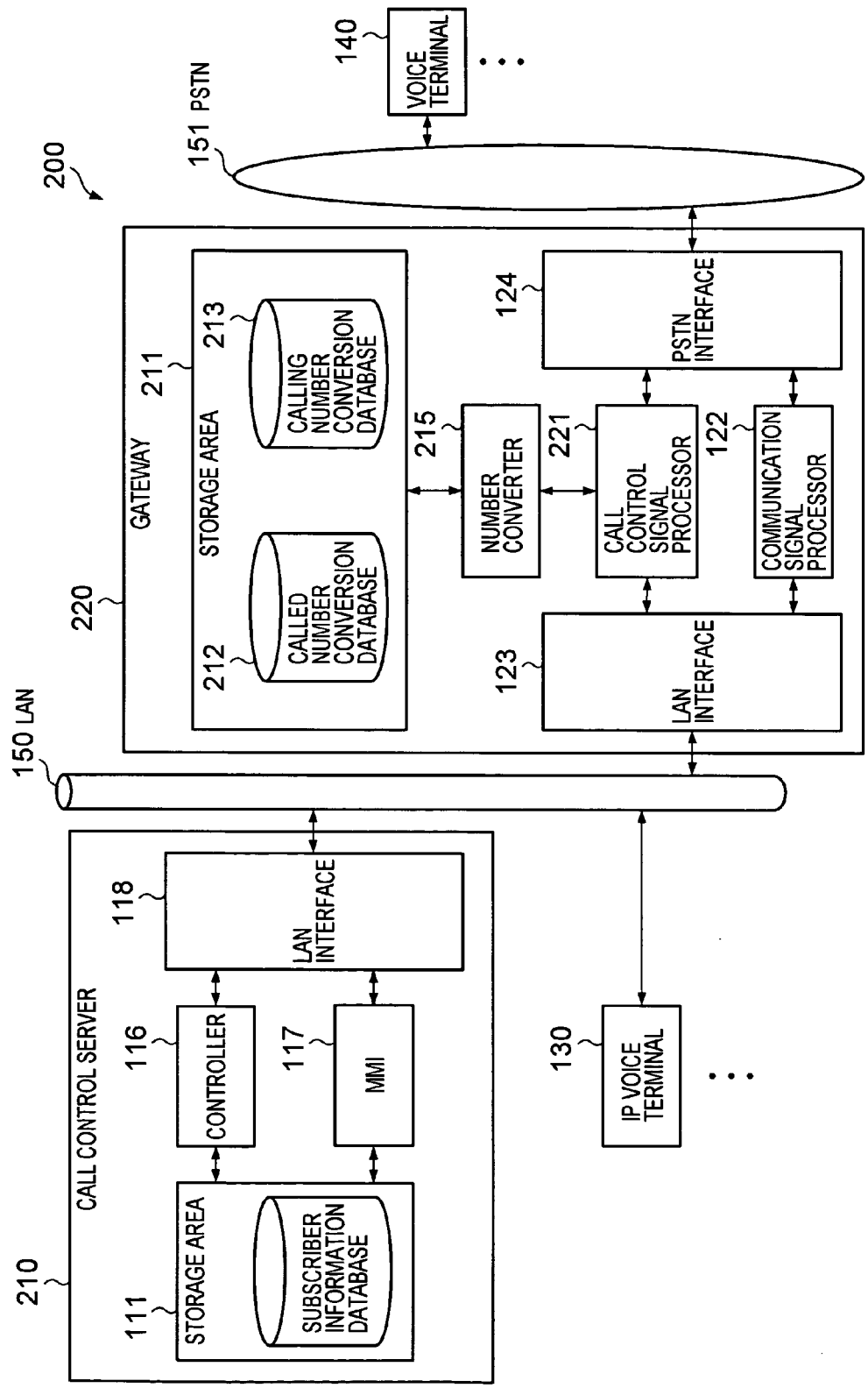
FIG. 8 is a schematic view of a telephony system.

For example, as shown in a telephony system 200 of FIG. 8, a gateway 220 may include a called number conversion database 212, a calling number conversion database 213, and a number converter 215.

In this case, when a call is made from a voice terminal 140 connected to a PSTN 151, to an IP voice terminal 130 connected to a LAN 150, the destination and source telephone numbers are extracted from a call control signal delivered from the voice terminal 140 to the gateway 220; a predetermined telephone number is converted; and a call control signal having the converted telephone number is transmitted to a call control server 210.

On the other hand, when a call is made from the IP voice terminal 130 connected to the LAN 150 to the voice terminal 140 connected to the PSTN 151, the destination and source telephone numbers are extracted from the connection request delivered from the IP voice terminal 130 connected to the LAN 150, to the gateway 220; a predetermined telephone number is converted; and a connection is made to the voice terminal 140.

Furthermore, the above-described embodiment relates to cases where the call control server 110 and the gateway 120 are provided, but is not limited to such cases. For example, as shown in a telephony system 300 of FIG. 9, a gateway 320 may include a storage area 311 having a called number conversion database 312, a calling number conversion database 313 and a subscriber information database 314; a number converter 315; a controller 316, and an MMI 317.

These elements operate similarly to the storage area 111, the number converter 115, the controller 116, and the MMI 117 shown in FIG. 1.

Furthermore, the above-described embodiment relates to cases where a telephone number is converted when an IP telephone and a PSTN telephone are connected from both sides, but is not limited to such cases.

For example, as shown in FIG. 10, a PBX (Private Branch Exchange) 400 may include a storage area 411 having a called number conversion database 412, a calling number conversion database 413, and an intra-office information database 491; and a number converter 415, so that the destination or source telephone number obtained from an extension trunk 493 or an outside-line trunk 494 is converted by a number converter 415, followed by the control of a switched circuit 492 in a controller 490.

When a call is made from a voice terminal 496, the PBX 400 connects through the switched circuit 492 to the telephone number of an extension voice terminal 495, stored in the intra-office information database 491. When a call is made from the extension voice terminal 495 to the voice terminal 496 or another extension voice terminal 495, the PBX 400 connects through the switched circuit 492 to the number to call.

The intra-office information database 491 stores information including the telephone number of the extension voice terminal 495 to manage in the PBX 400.

The above-described embodiment exemplifies a call control server, a gateway, and a PBX as a piece of equipment to manage a telephone number of a voice terminal, but any piece of equipment may convert a telephone number in the present invention, as long as it manages a telephone number.

In cases where both destination and source telephone numbers can be converted, a configuration may be set up in advance so as to convert only either one of the numbers.

What is claimed is:

1. Telephone number management equipment for managing a telephone number of a voice terminal, comprising:
 a called number conversion information storage area which stores destination telephone number discernment information for discerning a destination telephone number, first source telephone number conversion information for converting a source telephone number based on the destination telephone number discernment information, and first destination telephone number conversion information for converting a destination telephone number based on the destination telephone number discernment information;
 a source telephone number conversion information storage area which stores source telephone number discernment information for discerning a source telephone number, second destination telephone number conversion information for converting a destination telephone number based on the source telephone number discernment information, and second source telephone number conversion information for converting a source telephone number based on the source telephone number discernment information; and
 a number converter for:
  converting a source telephone number for which a call is made to the destination telephone number, based on the first source telephone number conversion information, in cases in which a destination telephone number is the telephone number discerned by the destination telephone number discernment information, converting the destination telephone number based on the first destination telephone number conversion information, and
  converting the source telephone number based on the second source telephone number conversion information, in cases in which a source telephone number is the telephone number discerned by the source telephone number discernment information, and converting the destination telephone number to which the source makes a call, based on the second destination telephone number conversion information; and
 the first and second source telephone number conversion information respectively includes first deletion information for specifying a number of digits to be deleted from the source telephone number and a first additional number information for specifying a number to be added to the source telephone number; and
 the first and second destination telephone number conversion information respectively includes second deletion information for specifying a number of digits to be deleted from the destination telephone number and a second additional number information for specifying a number to be added to the destination telephone number; and
 the number converter:
  deletes the number of digits specified by the first deletion information from a start of the source telephone number for which a call is made to the destination telephone number, and adds, to the start of the source telephone number after deletion, the number specified by the first additional number information; and
  deletes the number of digits specified by the second deletion information from a start of the destination telephone number to which the source makes a call, and adds, to the start of the destination telephone number after deletion, the number specified by the second additional number information.

2. Telephone number management equipment according to claim 1, wherein:
 the destination telephone number discernment information comprises information for specifying a number defined in advance, and
 the number converter determines that the destination telephone number matches the telephone number discerned by the destination telephone number discernment information, in cases in which the defined number is contained in the subject destination telephone number.

3. Telephone number management equipment according to claim 1, wherein:
the source telephone number discernment information comprises information for specifying a number defined in advance, and
the number converter determines that the source telephone number matches the telephone number discerned by the source telephone number discernment information, in cases in which the defined number is contained in the subject source telephone number.

4. Telephone number management equipment according to claim 1, wherein:
the number converter converts the source telephone number to the number to be specified by the first additional number information, in cases in which the number of digits to be designated in the first deletion information is equal or larger than the number of digits of the source telephone number.

5. Telephone number management equipment according to claim 1, wherein:
the number converter converts the destination telephone number to the number to be specified by the second additional number information, in cases in which the number of digits to be designated in the second deletion information is equal or larger than the number of digits of the destination telephone number.

6. Telephone number management equipment for managing a telephone number of a communication terminal, comprising:
a called number conversion information storage area which stores destination telephone number discernment information for discerning a destination telephone number, first source telephone number conversion information for converting a source telephone number based on the destination telephone number discernment information, and first destination telephone number conversion information for converting a destination telephone number based on the destination telephone number discernment information;
a source telephone number conversion information storage area which stores source telephone number discernment information for discerning a source telephone number, second destination telephone number conversion information for converting a destination telephone number based on the source telephone number discernment information, and second source telephone number conversion information for converting a source telephone number based on the source telephone number discernment information; and
a number converter for:
converting a source telephone number for which a call is made to the destination telephone number, based on the first source telephone number conversion information, in cases in which a destination telephone number is the telephone number discerned by the destination telephone number discernment information, converting the destination telephone number based on the first destination telephone number conversion information, and
converting the source telephone number based on the second source telephone number conversion information, in cases in which a source telephone number is the telephone number discerned by the source telephone number discernment information, and converting the destination telephone number to which the source makes a call, based on the second destination telephone number conversion information; and
the first and second source telephone number conversion information respectively includes first deletion information for specifying a number of digits to be deleted from the source telephone number and a first additional number information for specifying a number to be added to the source telephone number; and
the first and second destination telephone number conversion information respectively includes second deletion information for specifying a number of digits to be deleted from the destination telephone number and a second additional number information for specifying a number to be added to the destination telephone number; and
the number converter:
deletes the number of digits specified by the first deletion information from the source telephone number for which a call is made to the destination telephone number, and adds, to the source telephone number, the number specified by the first additional number information; and
deletes the number of digits specified by the second deletion information from the destination telephone number to which the source makes a call, and adds, to the destination telephone number, the number specified by the second additional number information.

7. Telephone number management equipment according to claim 6, wherein:
the destination telephone number discernment information comprises information for specifying a number defined in advance, and
the number converter determines that the destination telephone number matches the telephone number discerned by the destination telephone number discernment information, in cases in which the defined number is contained in the subject destination telephone number.

8. Telephone number management equipment according to claim 6, wherein:
the source telephone number discernment information comprises information for specifying a number defined in advance, and
the number converter determines that the source telephone number matches the telephone number discerned by the source telephone number discernment information, in cases in which the defined number is contained in the subject source telephone number.

9. Telephone number management equipment according to claim 6, wherein:
the number converter converts the source telephone number to the number to be specified by the first additional number information, in cases in which the number of digits to be designated in the first deletion information is equal or larger than the number of digits of the source telephone number.

10. Telephone number management equipment according to claim 6, wherein:
the number converter converts the destination telephone number to the number to be specified by the second additional number information, in cases in which the number of digits to be designated in the second deletion information is equal or larger than the number of digits of the destination telephone number.

* * * * *